(12) United States Patent
Biester et al.

(10) Patent No.: US 7,576,447 B2
(45) Date of Patent: Aug. 18, 2009

(54) CONTROL AND SUPPLY SYSTEM

(75) Inventors: Klaus Biester, Wienhausen (DE); Peter Kunow, Berlin (DE)

(73) Assignee: Cameron International Corporation, Houston, TX (US)

( * ) Notice: Subject to any disclaimer, the term of this patent is extended or adjusted under 35 U.S.C. 154(b) by 930 days.

(21) Appl. No.: 10/415,510

(22) PCT Filed: Oct. 30, 2001

(86) PCT No.: PCT/EP01/12547

§ 371 (c)(1),
(2), (4) Date: Jul. 21, 2003

(87) PCT Pub. No.: WO02/37640

PCT Pub. Date: May 10, 2002

(65) Prior Publication Data

US 2005/0185349 A1   Aug. 25, 2005

(30) Foreign Application Priority Data

Oct. 30, 2000   (DE) .......................... 200 18 560 U (51) Int. Cl.
- *H02J 1/10* (2006.01)
- *H04B 3/54* (2006.01)
- *H04B 13/02* (2006.01)

(52) U.S. Cl. .................... 307/12; 307/1; 307/3; 307/4; 307/11; 307/18; 340/850

(58) Field of Classification Search ................. 340/850; 307/1, 3, 4, 11, 12, 18; 363/39
See application file for complete search history.

(56) References Cited

U.S. PATENT DOCUMENTS 1,979,425 A   11/1934   Van Der Woude (Continued)

FOREIGN PATENT DOCUMENTS

DE   145 982   1/1981

(Continued)

OTHER PUBLICATIONS

Engels, Ludwig, u.a.: *Informationsübertragung, Prozeβankopplung und und Komponenten eines Doppelrechnersystems.* In: etz-a, Bd. 98, 1977: (pp. 602-606).

(Continued)

*Primary Examiner*—Albert W Paladini
*Assistant Examiner*—Hal I Kaplan
(74) *Attorney, Agent, or Firm*—Conley Rose, P.C.

(57) ABSTRACT

A control and supply system for electrical devices comprises at least one voltage supply and control device above sea level, a subsea cable connecting the voltage supply and control device with the electrical devices, and a control and actuating device which is associated essentially in situ with the electrical devices. The control and supply system allows supplies over larger distances, uses fewer devices, obtains higher efficiency and makes better use of the system. In order to achieve this, the voltage supply and control device comprises at least one AC/DC converter for producing a direct voltage in order to feed the subsea cable. The control and actuating device is associated with at least one DC/DC or DC/AC converter for converting the DC voltage transmitted by the sub-sea cable into a DC voltage or an AC voltage. The voltage generated thereby can be transmitted to the electrical device via a connecting line.

38 Claims, 2 Drawing Sheets

U.S. PATENT DOCUMENTS

| | | | | |
|---|---|---|---|---|
| 2,387,800 | A | | 10/1945 | Leland et al. ............... 268/74 |
| 3,275,737 | A | | 9/1966 | Caller |
| 3,324,741 | A | | 6/1967 | Anderson |
| 3,353,594 | A | * | 11/1967 | Lewis ...................... 166/336 |
| 3,887,898 | A | | 6/1975 | Jones ....................... 340/18 R |
| 3,980,808 | A | | 9/1976 | Kikuchi et al. |
| 4,062,057 | A | | 12/1977 | Perkins et al. |
| 4,124,884 | A | | 11/1978 | Episcopo |
| 4,290,101 | A | | 9/1981 | Hergenhan ................ 363/65 |
| 4,363,975 | A | | 12/1982 | Beattie ....................... 307/150 |
| 4,423,747 | A | | 1/1984 | Heiser et al. |
| 4,500,832 | A | * | 2/1985 | Mickiewicz ............. 323/340 |
| 4,521,642 | A | * | 6/1985 | Vives ........................ 174/70 S |
| 4,533,987 | A | | 8/1985 | Tomofuji et al. |
| 4,548,383 | A | | 10/1985 | Wolfges |
| 4,617,501 | A | | 10/1986 | Smith ........................ 318/459 |
| 4,639,714 | A | * | 1/1987 | Crowe ....................... 375/259 |
| 4,745,815 | A | | 5/1988 | Klopfenstein |
| 4,771,982 | A | | 9/1988 | Bodine et al. |
| 4,814,963 | A | * | 3/1989 | Petersen ................... 363/20 |
| 4,814,965 | A | * | 3/1989 | Petersen ................... 363/65 |
| 4,920,811 | A | | 5/1990 | Hopper |
| 5,031,088 | A | * | 7/1991 | Tanaka ..................... 363/71 |
| 5,055,991 | A | | 10/1991 | Carroll et al. |
| 5,105,351 | A | | 4/1992 | Harada et al. |
| 5,138,249 | A | * | 8/1992 | Capel ........................ 323/283 |
| 5,168,422 | A | * | 12/1992 | Duncan .................... 361/836 |
| 5,195,721 | A | | 3/1993 | Akkerman |
| 5,210,519 | A | * | 5/1993 | Moore ....................... 375/258 |
| 5,230,033 | A | | 7/1993 | Soodak |
| 5,285,563 | A | | 2/1994 | Nove et al. |
| 5,297,015 | A | | 3/1994 | Miyazaki et al. ............ 363/146 |
| 5,301,096 | A | | 4/1994 | Klontz et al. |
| 5,311,419 | A | | 5/1994 | Shires |
| 5,418,707 | A | | 5/1995 | Shimer et al. |
| 5,489,897 | A | * | 2/1996 | Inoue .................... 340/870.39 |
| 5,508,903 | A | | 4/1996 | Alexndrov |
| 5,563,780 | A | | 10/1996 | Goad |
| 5,572,182 | A | * | 11/1996 | De Pinho Filho et al.   340/855.4 |
| 5,573,032 | A | | 11/1996 | Lenz et al. ................. 137/486 |
| 5,610,452 | A | | 3/1997 | Shimer et al. |
| 5,629,844 | A | | 5/1997 | Krichtafovitch et al. |
| 5,682,303 | A | | 10/1997 | Goad |
| 5,731,969 | A | | 3/1998 | Small |
| 5,754,028 | A | | 5/1998 | Vezzini |
| 5,825,638 | A | | 10/1998 | Shutts ........................ 363/21 |
| 4,788,448 | A | | 11/1998 | Crowe ....................... 307/31 |
| 5,832,996 | A | | 11/1998 | Carmody et al. |
| 5,923,550 | A | | 7/1999 | Kumar ....................... 363/69 |
| 5,982,645 | A | | 11/1999 | Levran et al. |
| 5,983,743 | A | | 11/1999 | McGregor et al. |
| 5,984,260 | A | | 11/1999 | Rawson et al. |
| 6,032,924 | A | | 3/2000 | Castle |
| 6,041,667 | A | | 3/2000 | Pischinger et al. |
| 6,073,907 | A | | 6/2000 | Schreiner, Jr. et al. |
| 6,094,366 | A | | 7/2000 | Kalfhaus |
| 6,095,487 | A | | 8/2000 | Waber .................. 251/129.11 |
| 6,152,167 | A | | 11/2000 | Baker |
| 6,154,381 | A | | 11/2000 | Kajouke et al. |
| 6,158,295 | A | | 12/2000 | Nielsen |
| 6,181,576 | B1 | | 1/2001 | Ikeda et al. |
| 6,269,015 | B1 | | 7/2001 | Ikeda et al. |
| 6,356,384 | B1 | * | 3/2002 | Islam ........................ 359/334 |
| 6,388,904 | B2 | | 5/2002 | Nomura ..................... 363/71 |
| 6,411,527 | B1 | | 6/2002 | Reinold |
| 6,385,057 | B1 | | 7/2002 | Barron ....................... 363/17 |
| 6,420,976 | B1 | * | 7/2002 | Baggs et al. ............. 340/853.3 |
| 6,446,519 | B1 | | 9/2002 | Biester |
| 6,494,257 | B2 | | 12/2002 | Bartlett et al. ............. 166/86.2 |
| 6,529,120 | B1 | * | 3/2003 | Bilenko et al. ............. 375/130 |
| 6,559,385 | B1 | * | 5/2003 | Johnson et al. .......... 174/126.1 |
| 6,595,487 | B2 | | 7/2003 | Johansen et al. |
| 6,615,916 | B1 | | 9/2003 | Vachon .................. 166/250.01 |
| 6,659,200 | B1 | * | 12/2003 | Eppink ........................ 175/61 |
| 6,668,639 | B2 | | 12/2003 | Fong et al. |
| 6,741,162 | B1 | * | 5/2004 | Sacca et al. ..................... 307/3 |
| 6,965,302 | B2 | | 11/2005 | Mollenkopf et al. |
| 6,998,962 | B2 | | 2/2006 | Cope et al. |
| 7,075,414 | B2 | | 7/2006 | Giannini et al. |
| 7,264,057 | B2 | * | 9/2007 | Rytlewski et al. ........... 166/338 |
| 2001/0012207 | A1 | | 8/2001 | Nomura |
| 2005/0013148 | A1 | | 1/2005 | Kunow et al. |
| 2005/0029476 | A1 | | 2/2005 | Biester et al. |

FOREIGN PATENT DOCUMENTS

| | | | |
|---|---|---|---|
| DE | 34 17 455 | A1 | 5/1984 |
| DE | 3424041 | A1 | 6/1984 |
| DE | 33 03 248 | | 8/1984 |
| DE | 33 16 258 | | 11/1984 |
| DE | 34 24 041 | | 1/1986 |
| DE | 38 32 304 | | 3/1990 |
| DE | 43 44 709 | | 6/1993 |
| DE | 1 199 088 | | 8/1995 |
| DE | 44 14 677 | | 11/1995 |
| DE | 44 47 395 | | 6/1996 |
| DE | 196 14 627 | | 10/1997 |
| DE | 197 14 552 | | 10/1998 |
| DE | 197 50 041 | | 1/1999 |
| DE | 199 09 712 | | 7/2000 |
| DE | 199 63 105 | | 6/2001 |
| EP | 0 028 296 | | 8/1980 |
| EP | 0 303 801 | | 6/1986 |
| EP | 0 626 670 | | 11/1994 |
| EP | 0 384 607 | | 6/1995 |
| EP | 1 024 422 | | 8/2000 |
| EP | 1 107 437 | | 2/2001 |
| EP | 1 244 203 | | 12/2001 |
| FR | 1 390 757 | | 1/1965 |
| FR | 2 309 748 | | 11/1976 |
| FR | 2 353 992 | | 12/1977 |
| GB | 1001629 | | 8/1965 |
| GB | 2 266 942 | | 11/1993 |
| GB | 2 141 882 | | 1/1995 |
| GB | 2332220 | | 6/1999 |
| JP | 59 103570 | | 6/1984 |
| JP | 61 076071 | | 4/1986 |
| JP | 61 240858 | | 3/1987 |
| JP | 62 217857 | | 9/1987 |
| JP | 63 308420 | | 12/1988 |
| JP | 01 114368 | | 5/1989 |
| JP | 02 206362 | | 8/1990 |
| JP | 03 065054 | | 3/1991 |
| JP | 03 150068 | | 10/1991 |
| JP | 04 200270 | | 7/1992 |
| JP | 05 327381 | | 12/1993 |
| JP | 07 154967 | | 6/1995 |
| JP | 08338391 | A | 12/1996 |
| SU | 1270293 | * | 11/1986 |
| SU | 1 709 511 | | 1/1992 |
| WO | WO 95/20836 | | 8/1995 |
| WO | WO 96/28878 | | 9/1996 |
| WO | WO 97/38479 | | 10/1997 |
| WO | WO 99/37009 | | 1/1998 |
| WO | WO 98/30816 | | 7/1998 |
| WO | WO 01 37411 | | 5/2001 |
| WO | WO 01/52397 | | 7/2001 |
| WO | WO 01/84689 | | 11/2001 |

OTHER PUBLICATIONS

German Search Report for Appln. No. 200 18 560.8; Dated Oct. 23, 2001 (pp. 4).

International Search Report for Appln. No. PCT/EP02/10471 dated Jul. 14, 2003 (pp. 12).

Partial International Search Report for Appln. No. PCT/EP02/10468 dated Jan. 16, 2003 (pp.8).
International Search Report for Appln. No. PCT/EP02/10467 dated Sep. 29, 2003 (pp. 10).
International Search Report for Appln. No. PCT/EP02/10469 dated Oct. 23, 2003 (pp. 14).
Partial International Search Report for Appln. No. PCT/EP02/10469 dated May 16, 2003 (pp. 7).
German Search Report for Appln. No. 200 18 562.4; Dated Jul. 11, 2001 (pp. 4).
International Search Report for Appln. No. PCT/EP/12548 dated May 17, 2002 (pp. 2).
International Search Report for Appln. No. PCT/EP01/12550 dated Feb. 26, 2002 (pp. 6).
International Search Report for Appln. No. PCT/EP01/09513 dated Mar. 6, 2002 (pp. 7).
Chr. Rohrbach: *Handbuch für elektrisches Messen mechanischer Grössen;* 1967, Vdl—Verlag, Dusseldorf (DE) XP002156890 (pp. 448-449).
Brusewitz, M.: *Elektrochemische Aktoren;* F&M Feinwerktechnik Mikrotechnik Mikroelektronik; vol. 106, No. 7/8; Jul. 1998 (pp. 527-530.
J. R. Pinheiro et al; *Isolated Interleaved-Phase-Shift-PWM de-dc ZVS Converters;* IEEE 2000; (pp. 2383-2388).
Rene Torrico-Bascope et al; *Dual-Bridge DC-DC Converter with Soft Switching Features*; IEEE 2001; (pp. 722-727.
Demercil S. Oliveira et al; *A Lossless Commutation PWM Two Level Forward Converter Operating Like a Full-Bridge*; IEEE 2000 (pp. 334-338).
Demercil S. Oliveira et al; *A Lossless Commutation PWM Two Level Forward Converter;* IEEE 2000 (pp. 582-588).
J. E. Baggio et al; *An Improved Full-Load-Range Isolated ZVS-PWM DC-DC Converter*; IEEE 2001 (pp. 708-714).
British Combined Search and Examination Report for Appln. No. GB0603306.2 dated Mar. 14, 2006; (5 p.).
British Combined Search and Examination Report for Appln. No. GB0603307.0 dated Mar. 14, 2006 (6 p.).
British Combined Search and Examination Report for Appln. No. GB0603309.0 dated Mar. 14, 2006 (6 p.).
International Search Report for Appln. No. PCT/US05-14593 dated Sep. 29, 2006; (6 p.).
Office Action dated Aug. 30, 2006 for U.S. Appl. No. 10/836,559 (15p.).
Office Action dated Mar. 22, 2006 for U.S. Appl. No. 10/836,559 (16 p.).
Office Action dated Feb. 23, 2007 for U.S. Appl. No. 10/836,559 (20 p).
Office Action dated May 30, 2007 for U.S. Appl. No. 10/489,573 (37 p).
Office Action dated Dec. 8, 2005 for U.S. Appl. No. 10/489,533 (20 p.).
Final Office Action dated Jul. 28, 2006 for U.S. Appl. No. 10/489,533 (19 p.).
Office Action dated May 18, 2007 for U.S. Appl. No. 10/489,533 (15 p.).
Office Action dated Dec. 19, 2006 for U.S. Appl. No. 10/489,533 (16 p.).
Office Action dated Dec. 15, 2006 for U.S. Appl. No. 10/489,583 (16 p.).
Office Action dated Jul. 3, 2006 for U.S. Appl. No. 10/489,583 (17 p.).
Office Action dated Jun. 4, 2007 for U.S. Appl. No. 10/489,583 (17 p.).
Office Action dated Jul. 17, 2006 for U.S. Appl. No. 10/489,584 (17 p.).
Office Action dated Jun. 15, 2007 for U.S. Appl. No. 10/489,584 (12 p.).
Translation of Official Action dated Jan. 17, 2007 for Norwegian Appl. No. 20031892 (3 p.).
Office Action Dated Oct. 18, 2007 for U.S. Appl. No. 10/489,533; (15 p.).
Office Action Dated Nov. 13, 2007 for U.S. Appl. No. 10/489,573; (26 p.).
Office Action Dated Nov. 13, 2007 for U.S. Appl. No. 10/489,583; (16 p.).
Response to Office Action Dated Aug. 30, 2006 for U.S. Appl. No. 10/836,559 (pp. 24).
Response to Office Action Dated Feb. 23, 2007 for U.S. Appl. No. 10/836,559 (pp. 15).
Request for Continued Examination (RCE) and Response to Final Office Action Dated Aug. 9, 2007 (pp. 13).
Office Action Dated Feb. 21, 2008 for U.S. Appl. No. 10/836,559 (pp. 17).
Response to Office Action Dated Feb. 21, 2008 for U.S. Appl. No. 10/836,559 (pp. 12).
Office Action Dated Aug. 15, 2008 for U.S. Appl. No. 10/836,559 (pp. 17).
Response to Office Action Dated Apr. 7, 2008 for U.S. Appl. No. 10/489,533 (pp. 10).
Notice of Allowance and Fee(s) Due for U.S. Appl. No. 10/489,584 Dated May 29, 2008 (pp. 14).
Supplemental Notice of Allowability for U.S. Appl. No. 10/489,584 Dated Aug. 27, 2008 (pp. 8).
Notice of Allowance and Fee(s) Due Dated Jul. 16, 2008 for U.S. Appl. No. 10/489,583 (pp. 7).
Supplemental Notice of Allowability for U.S. Appl. No. 10/489,583 Dated Aug. 4, 2008 (pp.5).
Translation of Norwegian Official Action Dated Dec. 7, 2007 for Appl. No. 2004 1129 (pp. 6).
Translation of Norwegian Official Action Dated Jan. 30, 2008 for Appl. No. 2004 1130 (pp. 7).
Translation of Norwegian Official Action Dated Dec. 7, 2008 for Appl. No. 2004 1128 (pp. 3).
Translation of Norwegian Official Action Dated Feb. 5, 2008 for Appl. No. 2004 1134 (pp. 3).
Response to Office Action dated Aug. 15, 2008 for U.S. Appl. No. 10/836,559 (21 pp.).
Final Office Action Dated Feb. 19, 2009 for U.S. Appl. No. 10/836,559 (18 pp.).
Final Office Action Dated Dec. 12, 2008 for U.S. Appl. No. 10/489,533 (18 pp.).
Response to Final Office Action Dated Dec. 12, 2008 for U.S. Appl. No. 10/489,533 (11 pp.).
Translation of Norwegian Official Action dated Nov. 5, 2008 for Appl. No. 2004 1130 (6 pp.).
Translation of Norwegian Official Action dated Jan. 6, 2009 for Appl. No. 2004 1134 (4 pp.).
Norwegian Office Action Dated Dec. 5, 2008 for Appl. No. 01 980 532.4-2207 (3 pp.).

\* cited by examiner

FIG. 2

CONTROL AND SUPPLY SYSTEM

CROSS REFERENCE TO RELATED APPLICATIONS

The present application claims priority to PCT/EP01/12547 filed 30 Oct. 2001 and to German Application No. 200 18 560.8 filed 30 Oct. 2000, and is further related to U.S. application Ser. No. 10/836,559 filed Apr. 30, 2004; U.S. application Ser. No. 10/489,573 filed Aug. 5, 2004; U.S. application Ser. No. 10/489,533 filed Aug. 5, 2004; U.S. application Ser. No. 10/489,583 filed Aug. 5, 2004; and U.S. application Ser. No. 10/489,584 filed Aug. 5, 2004.

BACKGROUND OF THE INVENTION

The invention relates to a control and supply system for electrical devices, comprising at least one voltage supply and control device above sea level, a subsea cable connecting voltage supply and control device with the electrical devices, and a control and actuating device which is associated essentially in situ with the electrical devices.

Such control and supply systems are used, for example, in the production of natural gas and oil. In this respect, the application may take place with terrestrial and maritime drilling wells.

With maritime wells one part of the control and supply system is arranged on a platform above the sea surface. This part is in particular a voltage supply and control device which is connected via a subsea cable to the control and actuating device below the sea surface or also on the sea bed. The control and actuating device is connected to various electrical devices, such as motors, electrical actuators and similar equipment via appropriate connecting lines.

With this type of control and supply system known from practice, AC voltage is transmitted through a subsea cable, whereby the amplitude and frequency of the AC voltage is already selected such that, for example, on the end of the cable associated with the electrical devices a suitable supply voltage for the devices is provided. For the direct control of each device a separate subsea cable can be provided for each device. The data transmission also occurs via separate subsea cables.

A disadvantage with this known control and supply system is that, for example, for a supply of an electrical device with 240 VAC and with an original voltage feed of 600 VAC for the transmission of the appropriate power to the electrical devices and, for example, a length of subsea cable of 30 or 50 km, a cross-sectional area of 100 to 200 mm² is needed for the cable. In addition, data lines are required, so that a subsea cable with a substantial diameter arises.

In the above it has been assumed that 240 VAC is sufficient for the electrical devices. However, it has now been found that higher voltages are required, for example, in order to be able to actuate servomotors as electrical devices with higher power, for example, to close valves in the production of natural gas or oil in a maximum time period of one minute. With the application of such electrical devices supplied with a higher voltage the cross-sectional area of the subsea cable with the known control and supply system would increase still further.

In addition, it has been found in practice that on starting a servomotor as an electrical device and in particular for servomotors with a higher power, even with a slow starting process, a return signal occurs via the subsea cable to the voltage supply and control device indicating the starting process of the servomotor as a short circuit at the end of the cable. This leads to the switching off of a system automatically protected against short circuit. Furthermore, with the previously described control and supply system an efficiency for the overall system of only 27% is obtained referring to the output power.

With another control and supply system known from practice, transmission of AC voltage also occurs through the subsea cable. However, with this system an AC voltage, for example, at 10,000 VAC is transmitted via the subsea cable and at the control and actuating device it is reduced, for example, by a transformer to the voltage values required by the electrical devices. In addition, a number of power capacitors must be used to smooth the voltage again after the reduction. In order to be able to reduce, where required, the conductor cross-sectional areas for the subsea cable with this other known system, a power factor correction is also implemented to obtain an adequate efficiency for the overall system. Further devices, which are very complex and expensive, are needed for this correction.

However, even with the complete expansion of the previously mentioned system, the efficiency normally is less than 70% and the cross-sectional areas for a conductor in the subsea cable amount to about 16 or 26 mm² for a length of 30, or respectively 50 km.

BRIEF SUMMARY OF THE PREFERRED EMBODIMENTS

The object of the invention is to improve a control and supply system of the type mentioned at the beginning such that with less complexity, higher efficiency and better system usage, supply is possible over larger distances.

This object is solved in relationship with the characteristics of the generic term of claim 1 such that the voltage supply and control device for the production of a DC voltage for feeding into the subsea cable comprises at least one AC/DC converter, the control and actuating device is associated with at least one DC/DC or DC/AC converter for converting the DC voltage transmitted by the subsea cable into a DC voltage or AC voltage and the voltage generated thereby can be transmitted to the electrical devices via the connecting lines. This means that according to the invention DC voltage is transmitted via the long subsea cables, whereby the conversion from AC voltage into DC voltage or vice versa from DC voltage into AC voltage only takes place at the ends of the subsea cable. With DC voltage and the corresponding DC current, only real power is transmitted via the subsea cable and not apparent power. This means that the power factor is 1. Due to the DC voltage transmission along the subsea cable, even with high voltages only slight losses are present in comparison to a transmission of AC voltage with previously known systems.

Furthermore, with the transmission of DC voltage only small cross-sectional areas arise for a conductor in the subsea cable which may be only one tenth or less of the cross-sectional areas for the transmission of AC voltage.

Due to the DC/DC or DC/AC converter in the area of the control and actuating device, a corresponding conversion of the DC voltage takes place into the required DC or AC voltage values, such as for example, 240 V or 300 V with the appropriate frequency, for the electrical devices such as motors, actuators and similar equipment.

The system according to the invention is therefore distinguished by its simplicity and higher efficiency (at least 70%), whereby a significant cost saving can be obtained solely by the significant reduction of the cross-sectional area of the conductors in the subsea cable.

A simple voltage source for the system, which can also normally be used for other applications, can be seen in that an AC voltage source is connected to the supply voltage and control device for the supply with a three-phase AC voltage source.

With the previously known systems it is also possible to transmit data between the voltage supply and control device and the control and actuating device. Normally, a separate cable is used for this.

According to the invention, another advantage arises in that the DC voltage transmission along the subsea cable is free of any high frequencies and therefore voltage frequencies can be modulated onto the DC voltage in a simple manner for data transmission. Data modulation can especially take place in that the voltage supply and control device and the control and actuation device each include at least one data modulation device.

An effective type of data feed can be seen in that the data modulation device of the voltage supply and control device is arranged downstream from the DC/DC or AC/DC converter at the surface.

An effective type of data feed can be implemented if the data modulation device of the voltage supply and control device is arranged downstream from the DC/DC or AC/DC converter at the surface.

In order to be able to receive or feed in data in a simple and analogous manner also in the area of the control and actuation device, the data modulation device of the control and actuation device can be positioned upstream from the DC/DC or DC/AC converter located subsea.

In this way the data is fed in and also obtained from the DC voltage.

In order to prevent the occurrence of high currents and, where applicable, of damage to the relevant electrical devices, especially on the sea bed, an overcurrent control device can be assigned to the DC/DC or DC/AC converter.

With a DC/DC converter on the sea bed the high DC voltage of a number of thousands of volts fed from the surface of the sea is split up into appropriate DC voltages for the supply of the individual devices on the sea bed.

In order to be certain that the electrical devices are supplied with suitable voltage values, the DC/AC converter can be inductively coupled with an AC voltage measurement device, with a voltage shunt regulator. Due to the voltage shunt regulator, the system can, for example, run under full voltage also before the actuation of the electrical devices, whereby the voltage shunt regulator takes over the dynamic load regulation and then can reduce the voltage to appropriately low values.

Due to the inductive coupling, it is established as a further characteristic of the invention that suitable plug connections or other connections between subsea cables and electrical devices are not operated with DC voltage. It is generally known that even slight moisture is hazardous for the transmission of DC voltage and especially salt water acts as a galvanic element with DC voltage and would very quickly damage metallic contact surfaces. In order to keep the expense of such connections low, the inductive coupling takes place below sea level and the following transmission of the voltage can utilize AC voltage for which the usual, known maritime electrical connectors can be used.

By using the usual electrical connectors, it is also possible for all the connected parts to be recovered and to be fetched from below sea level and, for example, to service them and reuse them later. According to the invention a fixed and non-releasable connection between the subsea cable and appropriate devices is not required.

For the inductive coupling a transformer can be used, which directly carries out the conversion of the DC voltage into the AC voltage values for the electrical devices.

Such a transformer may comprise two separable, largely symmetrical and mutually associated coil half-cores.

In order to be able to simultaneously interchange data over the air gap between the coil half-cores, a data modulation device can be assigned to each coil half-core for the transmission of data.

In order to control and monitor the conversion of the DC voltage into AC voltage and to control and monitor at least the appropriate data modulation devices of the coil half-cores, a coupling control device appropriate for controlling the data modulation devices, the DC/AC converter and/or the AC voltage measurement device can be assigned to each coil half-core. A return signal to the voltage supply and control device for regulating the DC voltage can be provided from the AC voltage measurement device, whereby the return signal occurs via the appropriate coupling control devices, data modulation devices for the coil half-cores, data modulation device of the control and actuating device, subsea cable and data modulation device of the voltage supply and control device. In this way a continuous bidirectional data interchange between the voltage supply and control device and the control and actuation device is possible.

With a simple embodiment without further control devices, the AC voltage measurement device can be connected to the electrical devices for their supply.

The AC voltage measurement device can, for example, measure an amplitude of the AC voltage.

In some embodiments, it is advantageous if the AC voltage supplied by the DC/AC converter is, for example, a rectangular wave voltage. With this voltage the various electrical devices can be supplied with a stable voltage and with sufficient power.

A separate voltage stabilization, for example, using a Zener diode arrangement is no longer necessary due to the AC voltage measurement device with voltage shunt regulator according to the invention, because the AC voltage provided by this circuit is already statically and dynamically stabilized.

For the transmission of the DC voltage and also the electrical signals along the subsea cable, the cable can be advantageously formed from coaxial conductors. These exhibit optimum properties with regard to attenuation and immunity with regard to radiated noise and they enable a high data transmission rate of at least 100 to 600 kBaud. Furthermore, bidirectional transmission of data along the subsea cable can also be carried out simply.

The transformer can be realized such that the air gap between the two coil half-cores is, for example, at the most 4 mm or especially at the most 2 mm. In addition, appropriate materials for the coil half-cores can be used which are not susceptible to attack by sea water, such as arrangements of corrosion-resistant transformer steel sheet or plastic encapsulated magnetic powder mixtures for the appropriate coil core materials.

In order to be able to also pass data in the direction of the voltage supply and control device directly from the electrical devices or the AC voltage measurement device, the voltage shunt regulator can be realized bidirectionally.

Due to the application according to the invention of DC voltage or DC current and the resulting possible small cross-sectional areas of the conductors in the subsea cable, there is also the possibility that for each electrical device a separate connecting conductor can be provided in the subsea cable. In this relationship it must be noted that an electrical unit, for example, a single motor or a single actuator can also be a suitable tree structure or group of electrical motors, actuators or other electrical devices.

A suitably simple coupling of data—also multi-channel—can be realized in that the system exhibits a multiplexer device for data transmission.

BRIEF DESCRIPTION OF THE DRAWINGS

In the following an advantageous embodiment of the invention is explained in more detail based on the figures enclosed in the drawing. In the figures, like reference characters refer to the same components throughout the specification.

The following are shown:

FIGS. 1a-1c show a schematic diagram of various control and supply systems as a comparison, whereby FIGS. 1a and 1b are known in practice and whereby the control and supply system according to the invention is illustrated in FIG. 1c.

DETAILED DESCRIPTION OF THE PREFERRED EMBODIMENTS

Figure 1A:
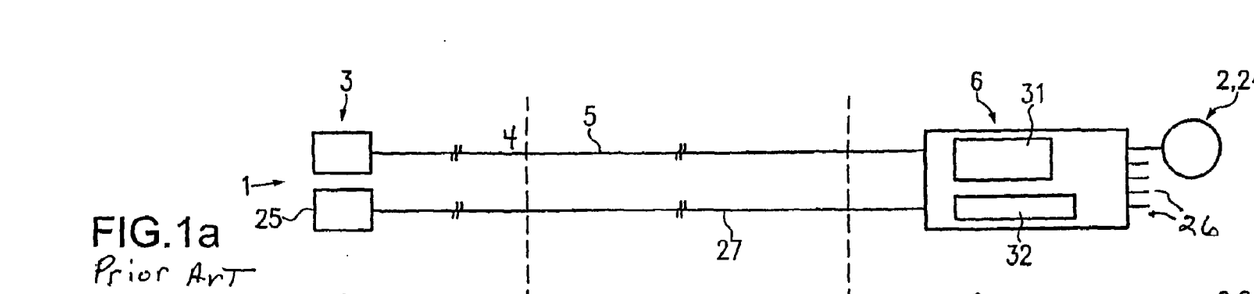

With the control and supply system according to FIG. 1a, a voltage supply and control device 3 with an appropriate voltage source and multiplexer device 25 is arranged above the surface of the sea 4. The voltage supply occurs via AC voltage, which is transmitted directly via a subsea cable 5 to a control and actuating device 6. This is arranged below sea level and is connected via connecting lines 26 to appropriate electrical devices 2 or electrical units 24. Such an electrical unit 24 may be formed by a group of electrical devices 2, which, for example, are arranged in the form of a tree structure and are controlled and actuated on a common basis.

A data cable 27 is provided for the data transmission between the multiplexer device 25 of the voltage supply and control device 3 and the control and actuating device 6. The data cable 27 is preferably composed of coaxial conductors.

Normally, an AC voltage of a maximum of 600 VAC is transmitted along the subsea cable 5. For the supply of the appropriate electrical devices with 240 VAC and appropriate power, cross-sectional areas of at least 175 mm$^2$ for appropriate conductors are required in the subsea cable for, for example, a length of 50 km.

The control and actuation device 6 includes at least one motor actuation device 31 and a control system 32. The various motors as electrical devices 2 can be used here for the actuation of valves, BOPs (blow-out preventers) and similar equipment which is used for the production of mineral oil or gas on the sea bed.

Figure 1B:
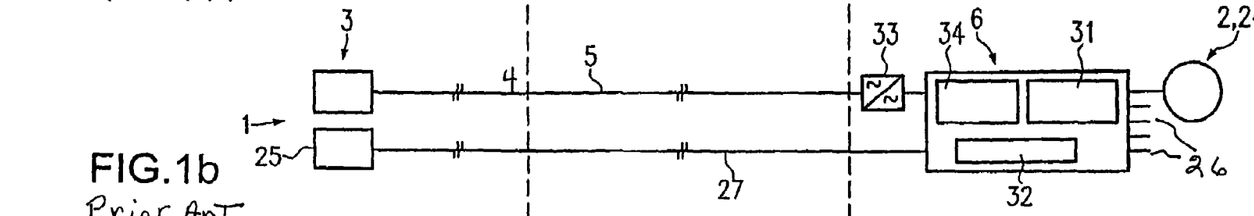

With the other known control and supply system according to FIG. 1b transmission of AC voltage along the subsea cable 5 also occurs. In this case however a voltage of a maximum of 10,000 VAC is transmitted which is reduced before the control and actuation device 6 by a suitable transformer 33 to the voltage values required for the electrical devices. Also, with this known system a separate data conductor 27 is provided as a coaxial cable or similar cable. The control and actuating device 6 according to FIG. 1b requires expensive power capacitors 34 in order to smooth the reduced AC voltage appropriately. In addition, with this system, as with the system according to FIG. 1a, power factor correction devices are needed to lower the apparent power of the system. Such correction devices are normally quite expensive and consist of capacitors or similar.

With the system according to FIG. 1b and for appropriate voltage values and powers for the electrical devices on the sea bed, conductor cross-sectional areas in the subsea cable of, for example, at least 75 mm$^2$ arise for a length of 50 km or with power factor correction at least a cross-sectional area of 26 mm$^2$ for a 50 km length.

Figure 1C:
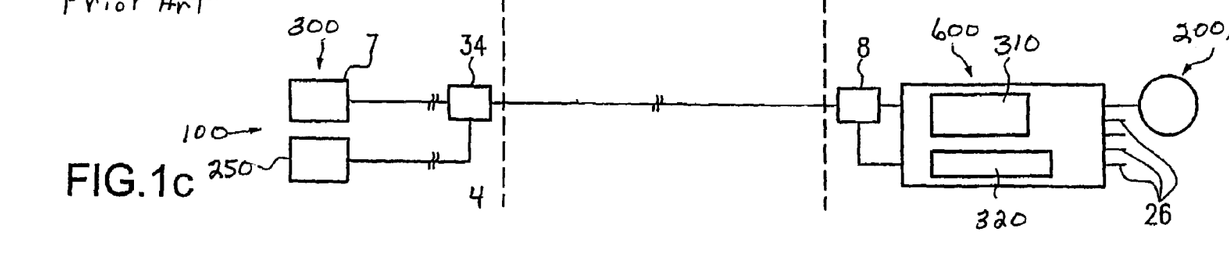

According to the invention and as in FIG. 1c, AC voltage is not transmitted via a subsea cable 50, but instead DC voltage is used. In FIG. 1c, a voltage supply and control device 300 comprises at least one AC/DC converter 7, which converts a suitable AC voltage from an AC voltage source 9, see FIG. 2, into DC voltage. In FIG. 1c, a control and actuation device 600 comprises a DC/DC or DC/AC converter 8 for the conversion of the DC voltage into DC or AC voltage. Since, according to the invention, a DC voltage is transmitted through the subsea cable 50, correspondingly no transmission of high frequency voltages occurs, so that signals for data transmission can be modulated onto the DC voltage in a simple manner. This takes place through a multiplexer device 250 and through an appropriate cable coupler 34. Demodulation of the data occurs appropriately in the area of the control and actuation device 600.

With the implementation of the converter 8 as DC/DC converter, a conversion of the high DC voltage transmitted through the subsea cable 50 into the DC voltages required for the supply of the appropriate device on the sea bed occurs. It must be noted that with a DC voltage supply of the device at the sea surface, a suitable data interchange with this device is simplified, because appropriate data signals can be modulated onto the DC voltage signal in a simple manner.

Figure 2:
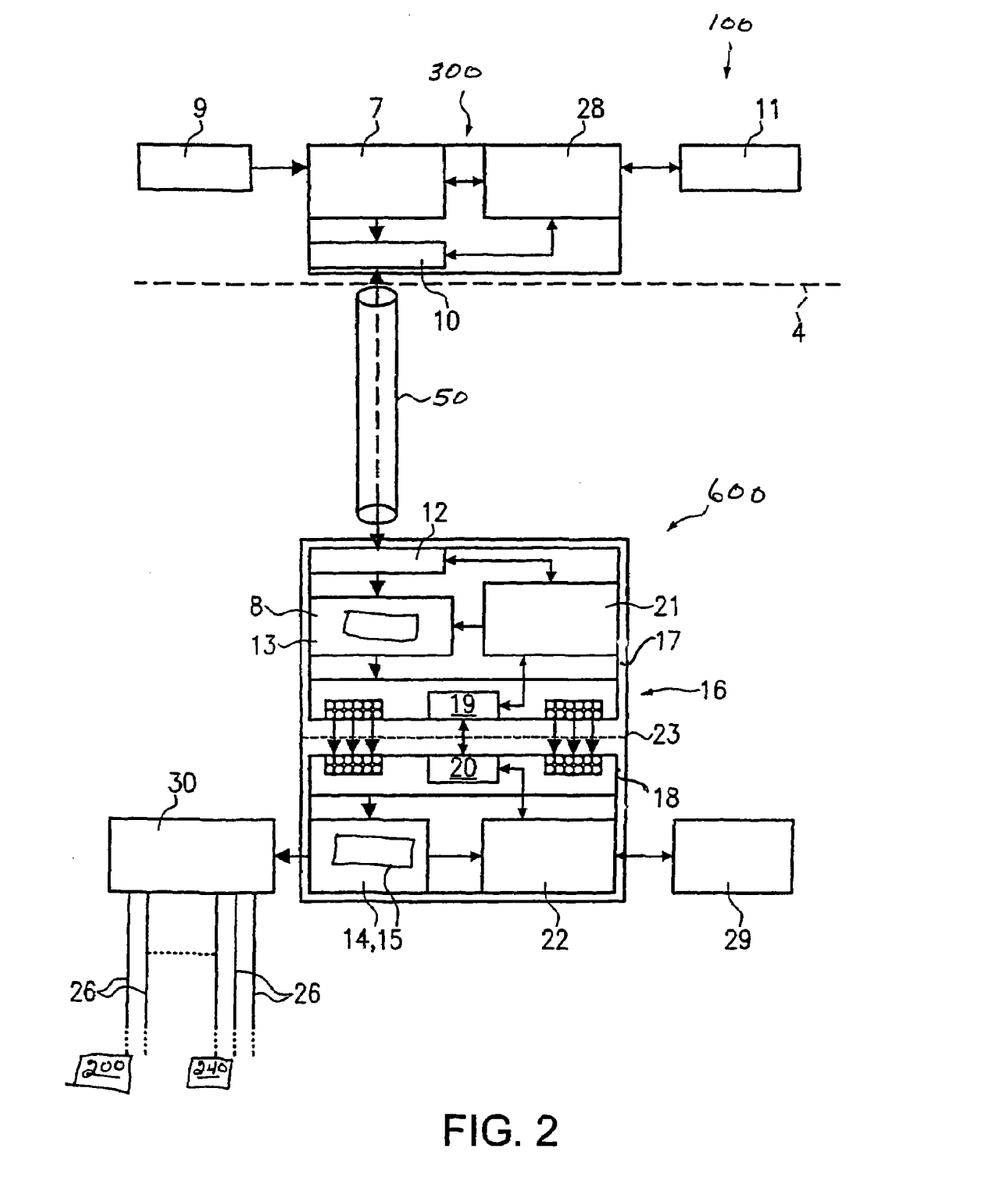
FIG. 2 shows a block diagram of the control and supply system according to the invention as in FIG. 1c.

The control and supply system 100 according to FIG. 1c is described in more detail based on a block diagram in FIG. 2.

With the embodiment of the control and supply system 100 according to the invention and as in FIG. 2, a voltage supply and control device 300 is arranged above the sea surface 4 and a control and actuation device 600 below the sea surface 4. The link between these two is realized by a subsea cable 50.

The voltage supply and control device 300 comprises at least one AC/DC converter 7 and a data modulation device 10. Furthermore, a surface control device 28, through which the control of the AC/DC converter 7 and also of the data modulation device 10 occurs, is assigned to the AC/DC converter 7 and the data modulation device 10.

The voltage supply and control device 300 is connected to an AC voltage source 9 which provides a three-phase AC voltage. Furthermore, the voltage supply and control device 300 is connected to a data transmission device 11 which can be positioned remote from the voltage supply and control device 300, but which is still part of the control and supply system 100. The control of the system and its monitoring can occur through the data transmission device 11.

The arrows shown between the various units in the system indicate through the arrow direction a transmission of voltage or data, whereby generally a bidirectional data transmission is possible.

The control and actuation device 600 is positioned below the sea surface 4 and, for example, positioned on the sea bed. It comprises a data modulation device 12 for demodulation of the data transmitted through the subsea cable 50, but also for the modulation of appropriate data onto the voltage transmitted through the subsea cable 50 when such data is transmitted in the reverse direction from the control and actuation device 600 to the voltage supply and control device 300.

Following the data modulation device 12, the control and actuation device 600 comprises a DC/DC or DC/AC converter 8. Using a DC/AC converter, the DC voltage transmitted through the subsea cable 50 is converted back into an appropriate AC voltage. An overcurrent control device 13 is assigned to the DC/AC converter 8. Following conversion of the DC voltage into AC voltage by the DC/AC converter 8, an inductive transmission of the AC voltage occurs to an AC voltage measurement device 14. The inductive transmission occurs through a transformer 16 consisting of two coil half-cores 17, 18. An air gap 23 is formed between these coil half-cores.

The AC voltage measurement device 14 is used for the determination of amplitude values of the AC voltage. As shown, a voltage shunt regulator 15 is included with the AC voltage measurement device 14. The voltage shunt regulator 15 provides an appropriate static and dynamic stabilization of the AC voltage. In some embodiments, the voltage shunt regulator 15 is bidirectional and, together with the AC voltage measurement device 14, is positioned on the output of the transformer 16. In this manner, a stabilized AC voltage is passed to a subsea voltage source 30 to which the various electrical devices 200 or units 240 are connected via electrical connecting lines 260.

A data modulation device 19, 20 as well as a coupling control device 21, 22 is assigned to each coil half-core 17, 18. The transmission of data occurs via the data modulation devices 19, 20. The coupling control devices 21, 22 are used for the control of the various data modulation devices 12, 19, 20 as well as the AC voltage measurement device 14 with voltage shunt regulator 15. Furthermore, the coupling control devices 21, 22 are used for the interchange of data, for example, with the AC voltage measurement device 14 with voltage shunt regulator 15 and/or, for example, with a subsea electronic module 29. This electronic module contains the appropriate electronics for controlling the various items of equipment below sea level and in particular on the sea bed, such as valves, blow-out preventers, actuators and similar equipment. The appropriate electronics is contained redundantly in the electronic module.

In the following the functioning principle of the control and supply system 1 according to the invention is briefly described based on FIG. 2.

According to the invention, supply of the control and actuation device 600 occurs with DC voltage through the subsea cable 50. Here, the DC voltage is converted to AC voltage by an appropriate DC/AC converter 8 only when it reaches the end of the long subsea cable. Above the surface of the sea a three-phase AC voltage is converted by an AC/DC converter to, for example, an output voltage from 3000 to 6000 V. The voltage value depends on the power requirements of the system.

Then, the stable and filtered DC voltage is passed to coaxial conductors in the subsea cable, whereby first data signals are modulated onto the voltage via a suitable data modulation device such as a modem or similar device.

Since coaxial conductors exhibit optimum properties with regard to attenuation and electrical noise, high data transmission rates of at least 100 to 600 kbaud are possible using such conductors.

On the sea bed or below the surface of the sea a demodulation of the data signals occurs using a suitable data modulation device, again such as a modem. Then, the voltage is converted by a DC/AC converter into, for example, a rectangular wave voltage of 300 V with a frequency of 20 kHz. This AC voltage can be transmitted over normal connection equipment to the various electrical devices. Only slight filtering is required without large electrolytic capacitors. The transformer 16 used for the conversion of the AC voltage of the DC/AC converter to the appropriate voltage values comprises two coil half-cores 17, 18, which are separated by an air gap. The coil half-cores are assigned to one another, separable from one another and are formed mutually symmetrically. This transformer provides the inductive coupling.

Then follows a measurement of the amplitude of the rectangular wave voltage by the AC voltage measurement device 14, to which furthermore a voltage shunt regulator 15 is assigned. A static and dynamic stabilization of the output voltage is largely provided by these two devices. Appropriate losses from the transformer and other devices in the control and actuation device 6 can be dissipated directly through contact with the sea water via appropriate wall construction on the device.

Data transmission from the measurement device 14 via the data modulation device 20 and 19 and via the additional data modulation device 12 and back to the voltage supply and control device 300 is possible for regulation of the voltage supply.

Using appropriate calculations for the required voltage values and powers, a conductor cross-sectional area of only approximately 2 mm$^2$ arises for, for example, a length of 50 km of subsea cable with the voltage control and supply system according to the invention. This is a substantially lower cross-sectional area than with systems known in practice, see FIGS. 1a and 1b.

In addition, high data transmission rates are possible due to the simple modulation and demodulation with respect to the DC voltage and the coaxial cable used. Through the devices used in the system according to the invention a stable supply voltage and high system reliability arise.

The invention claimed is:

1. A control and supply system for subsea electrical devices comprising:
    at least one voltage supply and control device above sea level;
    a subsea cable connecting said voltage supply and control device with the electrical devices;
    a control and actuating device arranged in situ with the electrical devices; and
    a connecting line connecting said control and actuating device to the electrical devices;
    wherein said voltage supply and control device comprises at least one AC/DC converter and is adapted to produce a direct current (DC) voltage that is fed into said subsea cable; and
    wherein the control and actuating device comprises at least one DC/DC or DC/AC converter for converting the DC voltage transmitted by said subsea cable into a second voltage such that the second voltage can be transmitted to the electrical devices via said connecting line,
    wherein the control and actuating device transmits data to the voltage supply and control device to regulate power provided by the voltage supply and control device.

2. The control and supply system according to claim 1, further comprising an AC voltage source connected to the voltage supply and control device which converts AC voltage to DC voltage to be conducted through said subsea cable, the AC voltage source being adapted to supply a three-phase AC voltage for conversion by the voltage supply and control device to DC voltage.

3. The control and supply system according to claim 1, wherein said voltage supply and control device and said control and actuating device each comprise at least one data modulation device to transmit data over the subsea cable at data transmission rates of 100 to 600 kBaud between said voltage supply and control device and said control and actuating device.

4. The control and supply system according to claim 3, wherein the data modulation device of said voltage supply and control device is positioned downstream from the AC/DC converter and transmits data via a multiplexer device.

5. The control and supply system according to claim 3, wherein said voltage supply and control device is connected to a data transmission device above sea level and remote from said voltage supply and control device.

6. A control and supply system for subsea electrical devices comprising:
   at least one voltage supply and control device above sea level;
   a subsea cable connecting said voltage supply and control device with the electrical devices;
   a control and actuating device arranged in situ with the electrical devices; and
   a connecting line connecting said control and actuating device to the electrical devices;
   wherein said voltage supply and control device provides a DC voltage that is fed into said subsea cable;
   wherein the control and actuating device comprises at least one DC/DC or DC/AC converter for converting the DC voltage transmitted by said subsea cable into a second voltage such that the second voltage can be transmitted to the electrical devices via said connecting line,
   wherein the control and actuating device controls the amount of power supplied by the voltage supply and control device.

7. The control and supply system according to claim 1, further comprising an overcurrent control device assigned to the DC/DC or DC/AC converter for outputting a controlled current to a transformer.

8. The control and supply system according to claim 1, wherein the DC/AC converter is inductively coupled with an AC voltage measurement device.

9. The control and supply system according to claim 8, further comprising a transformer inductively coupled between the DC/AC converter and the AC voltage measurement device.

10. The control and supply system according to claim 9, wherein the transformer comprises two separable coil half-cores which are largely symmetrical and assigned to one another.

11. The control and supply system according to claim 10, further comprising an air gap between the coil half-cores is a maximum of 4 mm wide.

12. A control and supply system for subsea electrical devices comprising:
    at least one voltage supply and control device above sea level;
    a subsea cable connecting said voltage supply and control device with the electrical devices;
    a control and actuating device arranged in situ with the electrical devices; and
    a connecting line connecting said control and actuating device to the electrical devices;
    wherein said voltage supply and control device comprises at least one AC/DC converter and is adapted to produce a first direct voltage that is fed into said subsea cable;
    wherein the control and actuating device comprises at least one DC/DC or DC/AC converter for converting the DC voltage transmitted by said subsea cable into a second voltage such that the second voltage can be transmitted to the electrical devices via said connecting line; and
    wherein the DC/AC converter is inductively coupled with an AC voltage measurement device; and
    further comprising a transformer inductively coupled between the DC/AC converter and the AC voltage measurement device; and
    wherein the transformer comprises two separable coil half-cores which are largely symmetrical and assigned to one another; and
    further comprising a data modulation device assigned to each coil half-core.

13. The control and supply system according to claim 12, further comprising a coupling control device assigned to each coil half-core and adapted to control the data modulation devices and the AC voltage measurement device.

14. The control and supply system according to claim 8, wherein the AC voltage measurement device is connected to the electrical devices through the connecting line and wherein the electrical devices are valves, blow-out preventers or actuators or any combination thereof.

15. The control and supply system according to claim 14, wherein the second voltage is an AC voltage having an amplitude adapted to be measured by the AC voltage measurement device and wherein the AC voltage provided for at least one of the electrical devices has an amplitude of approximately 300V.

16. The control and supply system according to claim 15, wherein the AC voltage provided by the DC/AC converter is a rectangular wave voltage having a frequency of approximately 20 kHz.

17. A control and supply system for subsea electrical devices comprising:
    at least one voltage supply and control device above sea level;
    a subsea cable connecting said voltage supply and control device with the electrical devices;
    a control and actuating device arranged in situ with the electrical devices; and
    a connecting line connecting said control and actuating device to the electrical devices; and
    wherein said voltage supply and control device comprises at least one AC/DC converter and is adapted to produce a first direct voltage that is fed into said subsea cable;
    wherein the control and actuating device comprises at least one DC/AC converter for converting the DC voltage transmitted by said subsea cable into a second voltage such that the second voltage can be transmitted to the electrical devices via said connecting line;
    wherein the DC/AC converter is inductively coupled with an AC voltage measurement device;
    wherein the AC voltage measurement device is connected to the electrical devices through the connecting line;
    wherein the second voltage is an AC voltage having an amplitude adapted to be measured by the AC voltage measurement device;
    wherein the AC voltage provided by the DC/AC converter is a rectangular wave voltage; and
    wherein the AC voltage is statically and dynamically stabilized by a voltage shunt regulator.

18. A control and supply system for subsea electrical devices comprising:
    at least one voltage supply and control device above sea level;
    a subsea cable connecting said voltage supply and control device with the electrical devices;
    a control and actuating device arranged in situ with the electrical devices; and a connecting line connecting said control and actuating device to the electrical devices;

wherein said voltage supply and control device comprises at least one AC/DC converter and is adapted to produce a first direct voltage that is fed into said subsea cable;

wherein the control and actuating device comprises at least one DC/AC converter for converting the DC voltage transmitted by said subsea cable into a second voltage such that the second voltage can be transmitted to the electrical devices via said connecting line;

wherein the DC/AC converter is inductively coupled with a voltage shunt regulator; and wherein voltage shunt regulator is bi-directional, wherein the control and actuating device interacts with the voltage supply and control device to regulate power.

19. The control and supply system according to claim 1, wherein the transmission of data along said subsea cable is carried out bi-directionally using a coaxial cable.

20. A control and supply system for subsea electrical devices comprising:
at least one voltage supply and control device above sea level;
a subsea cable connecting said voltage supply and control device with the electrical devices;
a control and actuating device arranged in situ with the electrical devices; and
a connecting line connecting said control and actuating device to the electrical devices; and
wherein said voltage supply and control device comprises at least one AC/DC converter and is adapted to produce a first direct voltage that is fed into said subsea cable;
wherein the control and actuating device comprises at least one DC/DC or DC/AC converter for converting the DC voltage transmitted by said subsea cable into a second voltage such that the second voltage can be transmitted to the electrical devices via said connecting line; and
wherein said subsea cable comprises a separate line for each of the electrical devices,
wherein the control and actuating device communicates with the voltage supply and control device to increase or decrease the supply of power to the electrical devices.

21. The control and supply system according to claim 1, further comprising a multiplexer device in between said voltage supply and control device and said control and actuating device.

22. A system for supplying voltage from a surface of the sea to a remote location subsea, the system comprising:
a voltage supply and control assembly at the surface converting AC voltage to a first DC voltage;
a control and actuating assembly at the subsea remote location receiving said first DC voltage and converting said first DC voltage to a second DC voltage;
a subsea cable extending through the sea from said voltage supply and control assembly to said control and actuating assembly to conduct said first DC voltage from said voltage supply and control assembly to said subsea control and actuating assembly; and
at least one electrical device being powered by said second DC voltage at the subsea remote location,
wherein the control and actuating assembly transmits data to the voltage supply and control assembly to regulate power provided by the voltage supply and control assembly to the at least one electrical device.

23. The system of claim 22 wherein said at least one electrical device comprises an electric motor being powered by said second DC voltage at the subsea remote location to actuate another device located subsea.

24. The system of claim 23 wherein said another device is a valve.

25. The system of claim 23 wherein said another device is a blowout preventer.

26. The system of claim 23 wherein said another device is an actuator.

27. The system of claim 23 wherein said at least one electrical device comprises a tree structure with a group of electrical devices.

28. The system of claim 23 wherein said at least one electrical device comprises a group of actuators and said control and actuating assembly at the subsea remote location supplying DC voltage to the group of actuators.

29. A system for supplying voltage from a surface of the sea to a remote subsea location, the system comprising:
a voltage supply and control assembly at the surface that supplies a first DC voltage;
a control and actuating assembly at the subsea remote location receiving said first DC voltage and converting said first DC voltage to a second DC voltage; and
a subsea cable extending through the sea to conduct said first DC voltage from said voltage supply and control assembly to said subsea control and actuating assembly,
wherein the control and actuating assembly implements a voltage shunt regulator that enables the system to operate under full voltage before actuating an electrical device at the remote subsea location using said second DC voltage.

30. A system for supplying voltage from a surface of the sea to a remote subsea location, the system comprising:
a voltage supply and control assembly at the surface that supplies a first DC voltage;
a control and actuating assembly at the subsea remote location receiving said first DC voltage and converting said first DC voltage to a second DC voltage; and
a subsea cable extending through the sea to conduct said first DC voltage from said voltage supply and control assembly to said subsea control and actuating assembly,
wherein the subsea cable extends up to 50 km and implements a conductor having a cross-sectional area up to 10 $mm^2$,
wherein the control and actuating assembly transmits data to the voltage supply and control assembly to change the amount of power provided by the voltage supply and control assembly.

31. A system for supplying voltage from a surface of the sea to a remote subsea location, the system comprising:
a voltage supply and control assembly at the surface that supplies a first DC voltage;
a control and actuating assembly at the subsea remote location receiving said first DC voltage and converting said first DC voltage to a second DC voltage; and
a subsea cable extending through the sea to conduct said first DC voltage from said voltage supply and control assembly to said subsea control and actuating assembly,
wherein the subsea cable is releasable subsea from the control and actuating device,
wherein the control and actuating assembly transmits data to the voltage supply and control assembly to vary the power provided by the voltage supply and control assembly.

32. A system for supplying voltage from a surface of the sea to a remote subsea location, the system comprising:

a voltage supply and control assembly at the surface that supplies a first DC voltage;

a control and actuating assembly at the subsea remote location receiving said first DC voltage and converting said first DC voltage to a second DC voltage; and a subsea cable extending through the sea to conduct said first DC voltage from said voltage supply and control assembly to said subsea control and actuating assembly, wherein the control and actuating assembly provides electronics for controlling valves, blow-out preventers and actuators, wherein the control and actuating assembly controls the supply of power provided by the voltage supply and control assembly to the valves, blow-out preventers and actuators.

33. The system of claim 32 wherein the voltage supply and control assembly provides between 3000 to 6000 V for distribution by the control and actuating assembly to the valves, blow-out preventers and actuators.

34. A system for supplying voltage from a surface of the sea to a remote subsea location, the system comprising:

a voltage supply and control assembly at the surface that supplies a DC voltage;

a control and actuating assembly at the subsea remote location receiving said DC voltage and converting said DC voltage to an AC voltage; and a subsea cable extending through the sea to conduct said DC voltage from said voltage supply and control assembly to said subsea control and actuating assembly, wherein the AC voltage passes through plug connections for distribution to at least one electrical device, wherein the control and actuating assembly transmits data to the voltage supply and control assembly to regulate power provided by the voltage supply and control assembly.

35. A system for supplying voltage from a surface of the sea to a remote subsea location, the system comprising:

a voltage supply and control assembly at the surface that supplies a DC voltage;

a control and actuating assembly at the subsea remote location receiving said DC voltage and converting said DC voltage to an AC voltage; and a subsea cable extending through the sea to conduct said DC voltage from said voltage supply and control assembly to said subsea control and actuating assembly, wherein the control and actuating assembly implements a transformer with two coil half-cores having an air gap between said two coil half-cores, wherein the control and actuating assembly transmits data to the voltage supply and control assembly to regulate power provided by the voltage supply and control assembly.

36. A system for supplying voltage from a surface of the sea to a subsea location, the system comprising:

a voltage supply and control assembly at the surface that supplies a DC voltage;

a control and actuating assembly located in sea water; and a subsea cable extending through the sea water to conduct said DC voltage from said voltage supply and control assembly to said subsea control and actuating assembly, wherein the control and actuating assembly comprises a transformer and a wall construction and wherein the wall construction dissipates losses from the transformer through direct contact with the sea water, wherein the control and actuating assembly signals the voltage supply and control assembly to regulate power provided by the voltage supply and control assembly.

37. A system for supplying voltage from a surface of the sea to a subsea tree, the system comprising:

a voltage supply and control assembly at the surface that supplies a first DC voltage;

a control and actuating assembly at the subsea tree receiving said first DC voltage and converting said first DC voltage to a second DC voltage; and a subsea cable extending through the sea to conduct said first DC voltage from said voltage supply and control assembly to said subsea control and actuating assembly, wherein the control and actuating assembly provides electronics for controlling servomotors that actuate subsea valves, blow-out preventers and actuators, wherein the control and actuating assembly transmits data to the voltage supply and control assembly to regulate power to the servomotors.

38. The control and supply system of claim 1 wherein the electrical devices comprise servomotors.

* * * * *

UNITED STATES PATENT AND TRADEMARK OFFICE
CERTIFICATE OF CORRECTION

PATENT NO. : 7,576,447 B2
APPLICATION NO. : 10/415510
DATED : August 18, 2009
INVENTOR(S) : Biester et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1434 days.

Signed and Sealed this

Fourteenth Day of December, 2010

David J. Kappos
*Director of the United States Patent and Trademark Office*